F. P. SNOW.
VALVE MECHANISM.
APPLICATION FILED OCT. 31, 1910.
1,138,324.
Patented May 4, 1915.
2 SHEETS—SHEET 1.
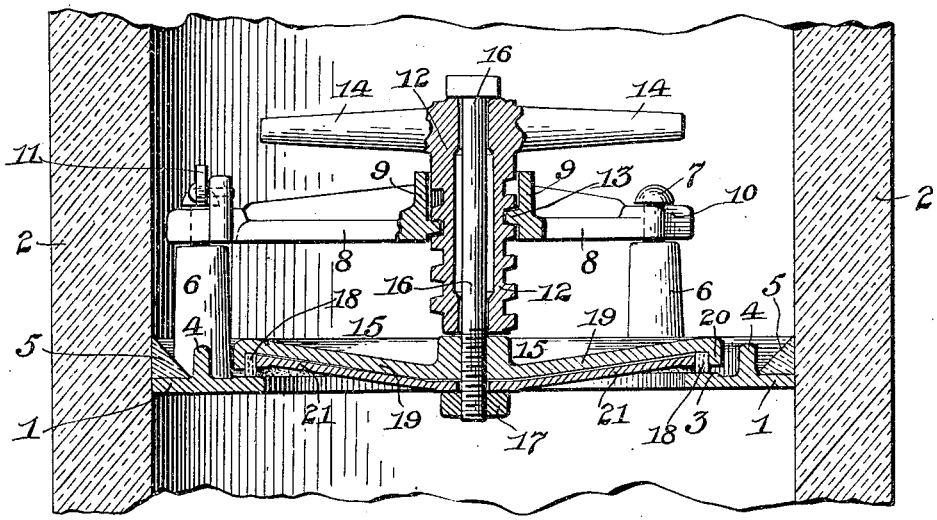
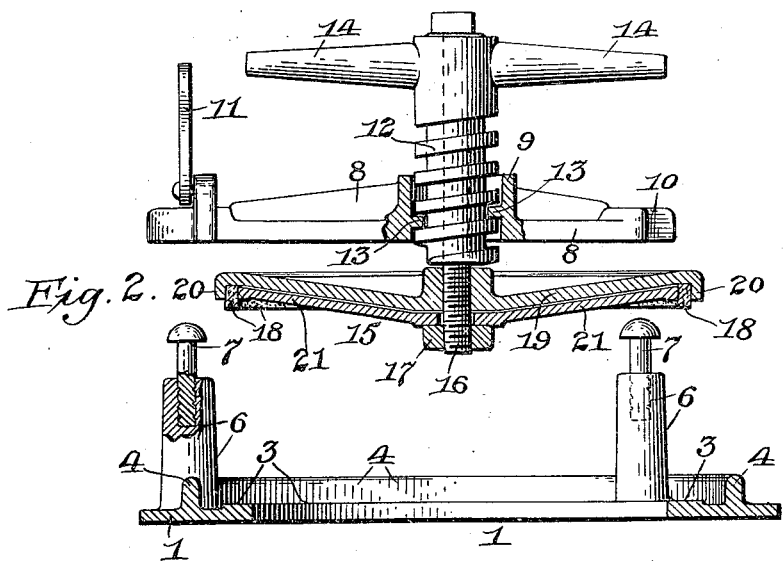
Witnesses
Bertha L. Scott
James Pirnie
Inventor
Frank P. Snow,
By Cassell Severance,
Attorney

F. P. SNOW.
VALVE MECHANISM.
APPLICATION FILED OCT. 31, 1910.

1,138,324.

Patented May 4, 1915.
2 SHEETS—SHEET 2.

Witnesses
Bertha L. Scott.
James Pennie

Inventor
Frank P. Snow,
By Cassell Severance,
Attorney.

UNITED STATES PATENT OFFICE.

FRANK P. SNOW, OF LOS ANGELES, CALIFORNIA.

VALVE MECHANISM.

1,138,324.          Specification of Letters Patent.          Patented May 4, 1915.

Application filed October 31, 1910. Serial No. 589,895.

*To all whom it may concern:*

Be it known that I, FRANK P. SNOW, a citizen of the United States, residing at Los Angeles, in the county of Los Angeles and State of California, have invented certain new and useful Improvements in Valve Mechanism, of which the following is a specification.

This invention relates to improvements in valves and particularly to irrigating valves that are adapted for use in stand pipes or other places in an irrigating system.

It is an object of the invention, among other things, to provide a simple and economical valve that can be adjusted so as to permit a small or large flow of water, as desired and which may be removed entirely when a full and unobstructed flow is required.

It is a further object of the invention to provide a valve mechanism in which the parts may be cheaply cast of suitable metal, in an economical way.

It is also an object of the invention to mount the valve upon a removable frame so that it may be entirely removed from the valve seat when a flow of the full capacity of the opening controlled by the valve, is desired.

With these and other objects in view the invention consists in certain novel constructions, combinations and arrangements of parts as will be hereinafter fully described and claimed.

Figure 3:
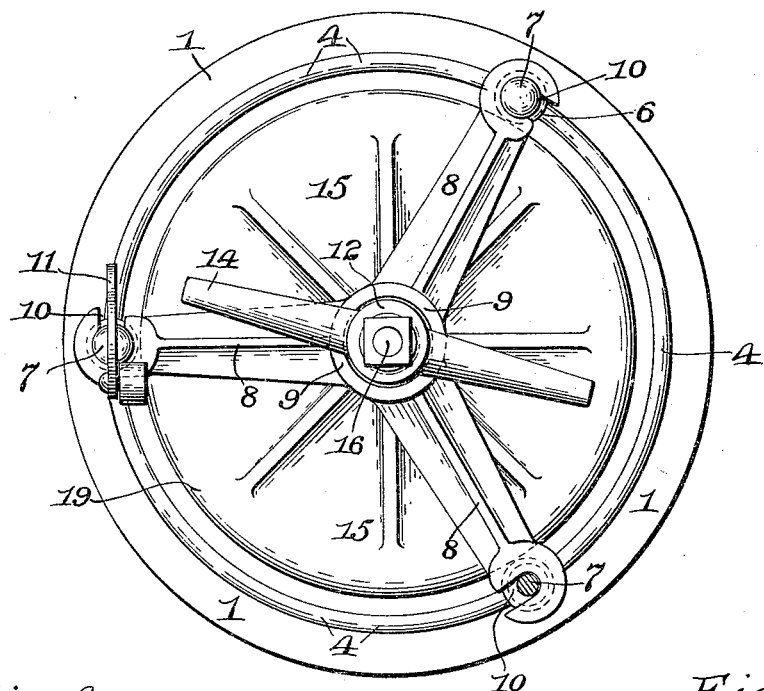
Figure 4:
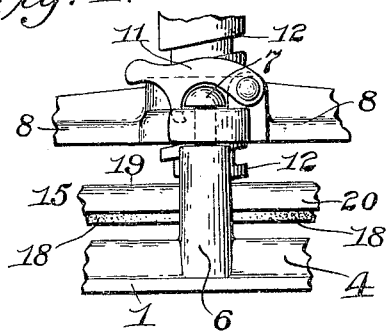
Figure 5:
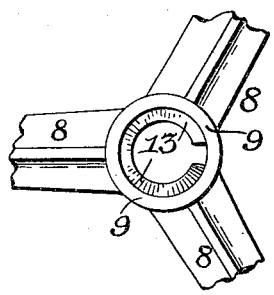

In the accompanying drawing forming a part of this specification:—Figure 1 is a vertical central sectional view through an irrigating stand pipe and the improved valve mechanism formnig the subject matter of the present invention. Fig. 2 is a similar view taken through the valve mechanism, but showing the valve lifted from the seat and having its support disconnected and ready for removal. Fig. 3, is a top plan view of the valve mechanism. Fig. 4, is a fragmentary detail view of a portion of the valve seat showing a post or standard formed thereon and illustrating a locking means used for holding the spider or valve support in place. Fig. 5, is a detail view of the central portion of the spider or valve support looking at the same from the top, the screw mechanism normally mounted therein being removed.

While the valve mechanism of the present invention is adapted for use in irrigating or other piping and may be employed at various points in a pipe system, the said mechanism has been illustrated in the drawing as mounted in a stand pipe of an irrigating pipe system.

The valve seat is formed upon a seat ring 1, which is fitted within the stand pipe 2. The ring 1 is preferably a flat piece, usually circular and having a central opening for the flow of water, the upper surface thereof being smooth near the inner edge of the ring, to provide a valve seat 3, which may be machine or tool finished or not as desired. An upwardly projecting annular flange 4 is preferably formed upon the upper surface of the ring 1 about midway of its width and protects the valve seat from cement or dirt that may drop into the stand pipe, especially when the ring 1 is being secured in place. In order to make a water tight joint between the ring and the standpipe, cement is placed, in green form, around the outer edge of the ring and against the standpipe, as indicated at 5, and allowed to set. In this manner the seat ring is secured and sealed in position. The flange 4 prevents any of the cement from falling upon the valve seat 3. The ring 1 is also provided with upwardly projecting standards or posts as 6, of a suitable height to properly support the spider or supporting frame of the valve proper. Headed studs 7 project from the upper ends of the posts 6. These studs are usually formed of headed nails or rivets which are preferably cast in the posts 6 when the ring 1 is formed. In this way the necessity for coring any of these parts is avoided.

The valve is adjustably supported upon a suitable frame or spider as 8. The spider 8 in the drawing is shown as having three radiating arms, though a greater or less number could be used without departing from the spirit of the invention. The arms of the spider project radially from a hub or barrel portion 9, at the center of the said spider and the outer ends of said arms are provided with recesses as 10, made to fit upon the studs 7 beneath their heads as clearly shown in Figs. 1, 3 and 4 of the drawing. The said recesses 10 are preferably made to face all in the same direction, so that by twisting the spider a little about its axis, the ends of the spider may be readily disconnected from the studs 7. To prevent accidental disconnection however, when it is desired to keep the valve in position at least one of the arms of the said spider 8 is provided with a pivoted latch as 11. As clearly shown in Fig. 4, the said latch 11 is curved centrally so as to hook over the head of one of the studs 7. One end of the said latch 11, is pivoted to a projection or lug upon the spider 8, while the other end of said latch is extended to form a finger engaging portion or handle, by which it may be raised or lowered. When the spider 8 is to be held in position on the posts, the latch 11, is dropped over the head of the stud beneath it and the spider is thus held against rotation or movement sufficient to disconnect it from the studs 7. When it is desired to remove the spider the latch 11 is lifted and the spider is turned sufficiently to unhook it from the studs 7. At such times the spider with the valve can be entirely removed from the standpipe and thus permit of an unobstructed flow of water through the valve opening.

The valve itself is carried by a hollow screw 12 having external threads formed thereon and arranged to engage an interrupted screw thread 13 formed upon the inner surface of the hub or barrel 9. Projecting laterally from the upper end of the screw 12 are arms 14, preferably two in number, by which the said screw may be turned in either direction for moving it up or down in the hub 9. The head of the screw may of course be engaged by hand, or by any kind of a handle or wrench for opening or seating the valve. The valve 15 is connected with the screw 12 by means of a bolt 16, which is tapped or screwed at its lower end into the central portion of the valve 15, the said bolt extending through the central bore or opening in the screw 12. The headed end of the bolt 16 rests upon the upper end of the screw 12 as clearly shown in the drawings whereby the bolt and the valve are movably held in place. The bolt 16 is sufficiently loose and free within the screw 12 to permit of the screw 12 being readily turned with respect thereto.

The valve 15 is preferably constructed in the form of a circular plate 19 having a depending peripheral flange 20 adapted for retaining the gasket 18 of the valve in place. The plate 19 is made of a size to just slip between the posts 6, so that said posts act as guides in directing the valve accurately to its seat. The gasket 18 is preferably formed of a strip of rubber fabric or other suitable material set in position against the flange 20 and arranged to be spread and gripped in place by a plate 21 which is applied to the under side of the valve plate 19. The said plate 21 is centrally perforated so as to be slipped upon the threaded end of the bolt 16 and a nut 17 applied to the end of the bolt, clamps the plate 21 firmly in position. The plate 21 is made slightly larger than the area of the space within the gasket 18 so that when the plate is forced into position it will squeeze the said gasket against the flange 20 of the plate 19. In this simple manner the said gasket is firmly gripped in position on the face of the valve 15.

By setting the gasket so that its edge face engages the valve seat 3, it is found that the rubber will not flake off and cleave to the valve seat after it has been pressed against the same for a long time, and as usually happens when the flat side face of a rubber gasket is pressed against a valve seat. Such flaking is apt to occur when rust forms upon the metal of the valve seat. In arranging the gasket upon its edge as shown and described the woven or textile portion of the rubber material extends through to the edge face against the metal of the valve seat and thus holds the rubber from flaking off.

The parts of the valve mechanism above described are so shaped that they may be economically cast in molding them in metal. As the valve plate 19 is imperforate with the exception of the center hole which is tightly closed by the bolt 16, there is absolutely no leakage when the valve is screwed down upon the valve seat 3. The interrupted thread 13, formed in the barrel 9 of the spider is ample for engaging the screw 12 and forcing the valve to its seat, and because of its formation, the spider may be cast without coring and without machine finishing any of the parts thereof.

It will be observed that the valve mechanism above described is simple in form and of economical construction and is admirably adapted to all the requirements of an irrigating system. When the spider 8 is in position on the posts 6, the valve may be partially opened to a greater or less degree for varying the flow of water and the valve may be forced tightly to its seat to absolutely cut off the flow of water. When the valve is loosened from the seat the spider 8 can be disconnected from its supporting posts, when the whole valve mechanism except the ring 1, may be removed from the pipe, so as to permit an unobstructed flow of water through the ring opening.

Having now described the invention what is claimed as new and it is desired to secure by Letters Patent, is:—

1. A valve mechanism comprising a valve seat plate having standards projecting therefrom, the said standards being provided with headed studs, a valve supporting spider shouldered upon said studs so as to be positively suspended thereon, a pivoted latch carried by the spider and capable of engaging one of said studs to prevent the spider from being disengaged from the studs by rotation about its axis, a reciprocating member mounted on the spider and a valve having a stem loosely mounted within the reciprocating member.

2. A valve mechanism comprising a valve, having a seat engaging gasket projecting from its face, a plate for gripping the gasket upon said face, a bolt extending through the plate and valve for holding them together, the said bolt projecting beyond the valve to form a valve stem, a screw carrying the said valve stem, a valve seat capable of engaging the gasket of the valve and means for supporting the said screw with the valve, adjacent to the valve seat.

3. In an irrigating valve mechanism a seat plate having valve guiding posts thereon adapted to guide a valve to the seat on the seat plate, a quickly removable support engaging the posts, a hollow member threadably engaging the support, a valve stem loosely journaled in the hollow member and a valve carried thereby, one end of the hollow member engaging one end of the valve stem while the other end of the hollow member loosely engages the valve.

4. In an irrigating valve mechanism, valve guiding posts, a support engaging the posts and removable therefrom when rotated in a given direction, means for locking the support against rotation with respect to the posts, a hollow member threadably engaging the support, a valve stem, one end of which engages one end of the hollow member, the other end of which loosely engages the other end of the hollow member, a valve carried by said latter named end of the valve stem, and means rigid with the hollow member whereby the same may be rotated with respect to the support in a direction to raise the valve.

5. In an irrigating valve mechanism, valve guiding posts, a support engaging the posts and removable therefrom when rotated in a given direction about the axis of the valve, means for locking the support to the posts, a valve, a member controlling the valve and moving therewith said member threadably engaging the support, and means rigid with the last-named means for rotating the valve.

6. In an irrigating valve mechanism, a seat plate having valve guiding posts thereon, a quickly removable support engaging the posts, a hollow member threadably engaging the support, said support having an interior inclined thread rib extending part way around said hollow member, whereby the hollow member and the support with said thread rib need not be finished smooth when cast, a valve stem loosely journaled in the hollow member, and a valve carried thereby.

In testimony whereof, I have hereunto set my hand, in presence of two witnesses.

FRANK P. SNOW.

Witnesses:
 EDNA B. ROLLINS,
 JAMES PENNIE.

Copies of this patent may be obtained for five cents each, by addressing the "Commissioner of Patents, Washington, D. C."